Oct. 24, 1961          H. J. BUTLER              3,005,522
                        DISC BRAKES
Filed March 28, 1958                         2 Sheets-Sheet 1
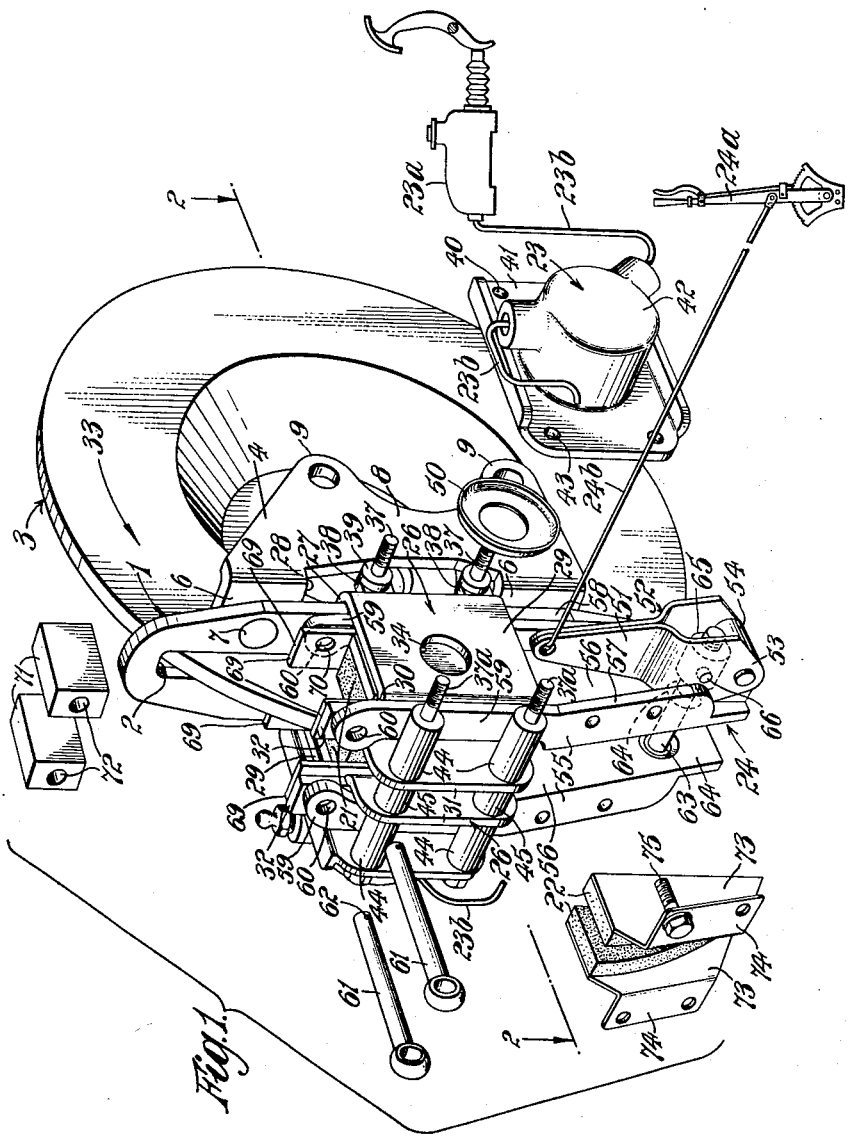
INVENTOR
Henry James Butler
by Benj. T. Auber
his attorney

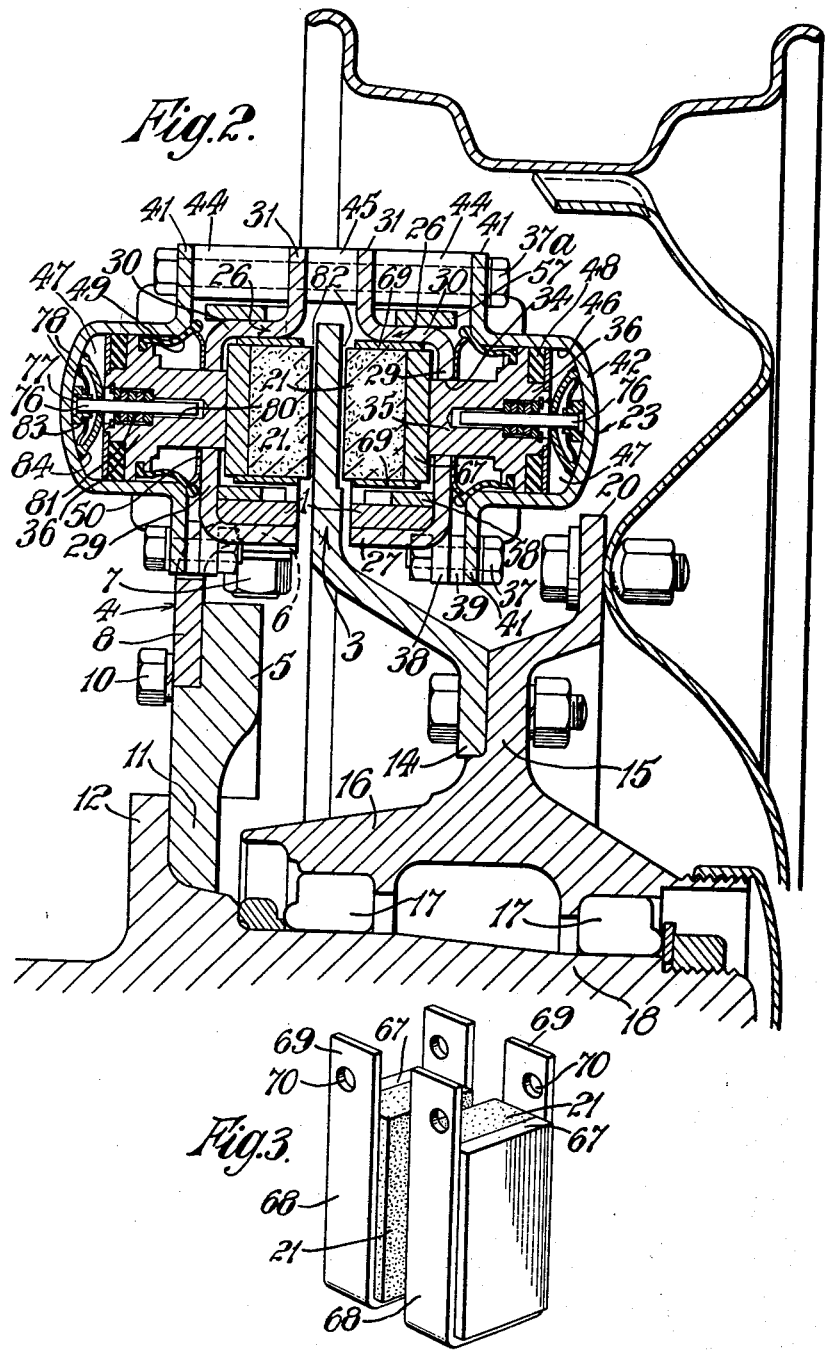

United States Patent Office 3,005,522
Patented Oct. 24, 1961

3,005,522
DISC BRAKES
Henry James Butler, Sutton Coldfield, England, assignor to Dunlop Rubber Company Limited, London County, England, a British company
Filed Mar. 28, 1958, Ser. No. 724,562
Claims priority, application Great Britain Apr. 3, 1957
12 Claims. (Cl. 188—73)

This invention relates to disc brakes and more particularly relates to a housing for a disc brake fabricated from pressings and the like.

Disc brakes, of the type described and claimed in Patent 2,790,516, April 30, 1957, comprise a caliper-type housing which extends around the outer periphery of a brake disc and covers a minor portion of the braking surfaces of the disc. These housings are normally made from solid metal and although it has been proposed to fabricate them from pressings, for reasons of lightness and economy of manufacture, such fabricated housings having not hitherto been strong enough to withstand the very considerable stresses imposed on braking.

The object of the present invention is to provide a disc brake comprising an improved housing fabricated from pressings or the like.

According to the present invention a disc brake comprises a rotatable disc, a non-rotatable caliper-type housing straddling the periphery of the disc and having pads of friction material associated therewith, means operable to force said friction pads into frictional engagement with opposite sides of said disc and a base plate completely encircling the periphery and radial sides of said disc on a chord thereof, the radially-inner ends of the limbs of said housing being rigidly secured to said base plate on opposite sides of said disc and said housing being fabricated from steel pressings or the like.

The base plate may be a flat steel plate of oval, rectangular or ellipsoidal shape and has a central rectangular slot through which the disc rotates. The caliper-type housing is mounted centrally of said base plate and comprises steel pressings welded or otherwise secured together to form a box-like structure on each side of the disc, with each of which an operating-mechanism and a pad of friction material are associated. Said box-like structures are joined together adjacent the periphery of the disc by tie-bolts or the like.

But a better understanding of the invention may be obtained from the following description when this is read with reference to the accompanying drawings, of which:

FIGURE 1 is a perspective, partly-exploded view of a brake according to the invention, FIGURE 2 is a section substantially on the line 2—2 of FIGURE 1, and FIGURE 3 is a detail view of a pair of friction pads showing the means whereby they are located in the housing.

As illustrated in the drawings, a vehicle disc brake having a housing constructed in accordance with the invention comprises a flat steel base plate 1 of substantially ellipsoidal shape, having a thickness of the order of ¼", and provided centrally with a slot 2 sufficiently wide to allow the disc 3 to rotate freely therein. This base plate 1 is fitted chordally over the disc 3, the radially inner surface thereof being provided with means for attaching it to a non-rotatable member 5 (FIGURE 2) of the vehicle. This means comprises an angle plate 4 having a portion comprising two spaced ears 6 secured to the base plate 1 as by countersunk bolts 7 secured in the base plate 1 between the slot 2 and one longitudinal edge of the base plate 1 and a portion 8 extending radially inwardly parallel with the plane of the disc 3 and having two circumerentially-spaced ears 9 which are secured to the non-rotatable portion 5 by bolts 10 passed through holes in the ears 9 and through co-operating holes in a flange 11 formed integrally with the front stub axle 12 of the vehicle or, alternatively, in a similar flange formed on the rear axle housing in the known manner.

The disc 3 comprises annular braking surfaces adjacent the outer periphery on opposite radial sides thereof and an axially-offset annular flange 14, parallel with the braking surface, which is secured to an annular flange 15 extending radially outwardly from the wheel hub 16 which is mounted to rotate on bearings 17 on the journal 18 of the stub axle 12 in the known manner. The body portion 19 of the wheel is detachably secured to an axially offset radial extension 20 of the flange 15. Thus, when the wheel body 19 and hub 16 are rotating, the disc 3 rotates in the slot 2 of the base plate 1 which is held against rotation by the attachment of the portion 8 to the non-rotatable flange 5.

The caliper portion of the brake housing, i.e., that portion thereof which carries the friction pads 21 and 22 and the brake operating mechanisms 23 and 24, is built up from steel pressings and is secured to the base plate 1 medially of its opposite ends. The caliper member comprises a pair of channel-like limbs 26 disposed one on each of the braking surfaces of the disc 3. Each limb 26 comprises a base portion 27 secured to the base plate 1 on the radially-inner face thereof, medially of its length, one on each side of the slot 2. The portion 27 on the same side as the angle plate 4 is inserted through a slot 28 between the ears 6, and the portion 27 on the other axial side of the base plate 1 is secured in symmetry with its opposite portion 27.

The plates forming the limbs 26 are then turned radially-outwardly, parallel with the braking surfaces of the disc, and spaced apart therefrom, to form outer walls 29 which have an inside radial depth somewhat greater than the radial depth of the braking surfaces. The walls 29 are then turned axially towards each other, i.e., towards the disc 3, for a distance slightly less than the equivalent dimensions of the portions 27 to form radially-outer walls 30, and are then again turned radially-outwardly, parallel with the walls 29, to form tab portions 31 which extend radially-outwardly beyond the outer periphery of the disc 3. The radially-outer wall portions 30 are each formed with an extension tab or ear 32 which extends laterally of the limbs 26 parallel with the base plate 1 and towards one longitudinal end thereof. Although not essential, these ears 32 will preferably extend in a direction which will meet the disc 3 in its normal direction of rotation which, in FIGURE 1, is in the direction of the arrow 33 thereon. The reason for this will be apparent hereunder.

Each wall portion 29 has an aperture 34 formed centrally therethrough and this aperture is of such size as to permit the axial extension 35 of the piston 36 of the piston and cylinder fluid-pressure mechanism 23 to be freely slidable therein.

The piston and cylinder mechanisms 23 are detachably secured to the walls 29, with the extension 35 passing through the aperture 34, by bolts 37, 37a. The bolts 37 on the radially-inner walls 27 of the limbs 26 are passed through holes formed in ears 38 pressed outwardly of the walls 27. A distance piece 39 is placed on each bolt 37 and the mechanism 23 is secured thereto by passing the bolts 37 through holes 40 in the flange 41 surrounding the cylinder block 42 and securing the bolts by nuts in the known way. One such mechanism 23 is secured to each wall 29 and there are accordingly two bolts 37 on each side of the housing.

The radially-outer bolts 37a serve, not only to secure the radially-outer portions of the flanges 41 to the limbs 26, but also serve to connect the limbs on each side of the disc 3 rigidly together adjacent its outer periphery. The bolts 37a are accordingly much longer than the bolts 37, and only two of these are used. The bolts 37a are passed firstly through holes 43 in one of the flanges 41, then through cylindrical distance pieces 44, interposed between the inner face of the flanges 41 and the tabs 31 of one limb 26. The distance pieces 39 and 44 are of such length that the mechanism 23 is held squarely and firmly against the outer surface of the wall 29. The bolts 37a, after passing through the tabs 31 on one side of the disc are then passed through distance pieces 45, between the tabs 31 of opposite limbs 26, through further distance pieces 44 and then through the holes 43 in the flange 41 of the other mechanism 23. When secured by the appropriate nuts, the bolts 37a hold the whole caliper rigidly together at its radially-outer edge. The distance pieces 45 are of such length that when the bolts 37a are firmly secured the walls 29 and tabs 31 lie parallel with the braking surfaces of the disc 3.

The pistons 36 are fluid-tightly slidable in the cylinders 46 under the influence of fluid-pressure admitted into the spaces 47 by actuation of a master-cylinder 23a, or the like, to force fluid-pressure through conduits 23b in the manner known for the hydraulic or pneumatic operation of fluid braking systems. The pistons 36 are each provided with an annular sealing ring 48 and with a flexible annular diaphragm 49, the inner periphery of which is secured in an annular groove in the piston 36 and the outer periphery of which is pressed against the periphery of the open end of the cylinder 46 by a dished retainer 50 which is placed on the extension 35 of the piston 36 before the mechanism 23 is secured to the wall 29. The retainer 50 is resilient and engages the wall 29 at its inner periphery and the diaphragm 49 with its outer periphery, the diaphragm and retainer thus acting as a dust and dirt seal for the piston and cylinder.

Means 24 are also provided for the manual operation of the brake as by operation of a hand lever 24a or the like, in the known way, to exert a pull upon a linking rod or cable 24b connected at its opposite ends to the hand lever 24a or the like and to the one end 51 of a pivoted bifurcated lever 52 which has its bifurcated end 53 pivoted on a fulcrum block 54 secured to one of a pair of pivoted pressure plates 55 which extend from the limbs 26 parallel with the base plate 1, one on each side of the disc 3 and in the opposite direction to the ears 32 on the walls 30.

The pivoted pressure plates 55 are of channel section and are disposed with the webs 56 of the channels facing each other on opposite sides of the disc 3 and the limbs 57, 58 of the channels facing axially-outwards away from the disc. The plates 55 are of truncated triangular shape and are disposed with the truncated apices of the triangles directed away from the limbs 26. At the bases of the triangles, the limbs 57, 58 of the channels are extended beyond the webs 56 in the form of parallel elongated ears 59 which are each provided with a hole 60 therethrough.

The ears 59 on each limb 58, i.e., the radially-inner limbs of the plates 55, are passed within the housings 26 so that they lie against the radially-outer surface of the back plate 1, one on each side of the disc 3, and the ear 59 on each outer limb 57 is passed between the distance piece 44 and the outer wall 30 of one limb 26 so that it lies against the wall 30 and adjacent the ear 32 on that respective wall. The plates 55 are pivoted to swing in a plane normal to the plane of the disc 3 upon pins 61 which are passed through the holes 60 in the ears 59, and through co-axial holes formed in the ears 32 and in the base plate 1. The pins 61 are secured in place by split pins or the like passed through holes 62 in the pins 61 on the radially-inner side of the base plate 1. Further reference is made to the pins 61 hereunder.

The plates 55 are linked together near their truncated apices, inwardly thereon from the fulcrum block 54, by a screw-threaded pin 63 which is rigidly secured in the web 56 of the plate 55 opposite to that to which the fulcrum block 54 is secured and passes loosely through a hole 64 in the other plate 55 adjacent the fulcrum block 54. A nut 65 is adjustably screw-threaded on the end of the pin 63 and has trunnions 66 extending diametrically from opposite sides thereof, the trunnions being located in holes formed in the bifurcated lever 52 at a short distance inwardly thereon from the fulcrum block 54 and in alignment with the pin 63.

Pads 21 and 22 of friction material are provided for the fluid-operated main brake and for the manually-operated brake, respectively, and these pads are so constructed that they may be inserted in, and removed from, the brake without interfering with any major portion of its structure.

The pads 21 for the main brake are rectangular in shape and are each mounted on a metal backing plate 67, as by bonding or adhesives. Each pad 21 and backing plate 67 is loosely located in a U-shaped saddle member 68, the opposite limbs 69 of which extend beyond the adjacent edge of the pad 21 and have holes 70 formed co-axially therethrough.

Prior to the insertion of the pins 61 a pad 21 and saddle member 68 is inserted into each limb 26 between the radially-outer face of each limb 58 and the radially-inner face of each wall 30, and is pressed inwards thereof, tangentially of the disc 3, until the holes 70 come into co-axiality with the holes 60. The pins 61 are then inserted and secured, as previously described, a retainer 71 being inserted between the limbs 69, and the pins 61 passing through the holes 60 and 70 and through holes 72 in the retainers 71 and through the base plate 1 as described hereabove. The bases of the saddles 68 prevent the pads 21 from dislodgement in the direction of the arrow 33 and the retainers 71 prevent them from dislodgement in the opposite direction upon reverse rotation of the disc 3. Upon removal of the pins 61, however, the pads may readily be removed by drawing the saddles 68 out of the limbs 26 in a direction substantially tangential of the disc 3.

The friction pads 22 for the manual portion of the brake are substantially triangular in plan, the radially-outer edge, which is the hypotheneuse of the triangle, being arcuate on the same curvature as the periphery of the disc 1. The radially inner edge of the triangle and the base thereof are substantially at right angles to each other.

Each pad 22 is secured, as by bonding, adhesives or moulding, to a backing plate 73 which comprises a metal plate covering the full plan area of the associated pad 22 and having a radially-outward extension carrying a flange 74 whereby the backing plates 73 are adapted to be detachably secured to the limbs 57 of the plates 55, as by bolts 75, with the backing plates 73 in abutment against the webs 56 and the pads 22 lying adjacent opposite braking surfaces 13 of the disc 3 with the radially inner edges of the pads 22 lying on a chord of the disc 3 parallel with the base plate 1.

The piston and cylinder mechanisms 23 are each provided with an automatic retraction device which may be of one of the types more fully described in the specification of our prior British patent application No. 29,937/55; and pending U.S. application Ser. No. 644,023 filed Mar. 3, 1957, now Patent No. 2,984,319 and Ser. No. 724,546, filed Mar. 28, 1958, now Patent No. 2,948,356.

Briefly, as shown in FIGURE 2, such a device comprises a pin 76 having an enlarged head 77, held, with axial movement through a restricted distance against a spring 78, in a recess associated with the base of the cylinder 46. The pin 76 extends axially into a recess 80 in the piston 26 and is loosely slidable therein. A helical friction member 81 engages the pin 76 within the recess 80 with a predetermined degree of interference, the friction member 81 being secured against axial movement in the recess 80. The restricted distance of movement of the pin 76 against the spring 78 is equal to the clearance 82 normally existing between the pads 21 and the disc 3 when the brake is disengaged, so that when the piston 26 is forced outwardly of the cylinder 46 to engage the brake the pin 76 will move therewith until the bush 83 associated with the spring 78 is pressed against an adjacent rigid closure member 84. If, through wear of the pads 21, the clearance 82 is greater than the restricted distance, further movement of the piston 26 to actually engage the pads 21 with the disc 3 will cause the friction member 81 to slip on the pin 76. Upon release of the brake the spring 78 will retract the piston 36 through the restricted distance only.

The fluid-pressure brake operates in substantially the known manner. Upon actuation of the master cylinder 23a, or the like, fluid-pressure is directed through the conduits 23b into the spaces 47 of the fluid-pressure mechanisms 23, forcing the pistons 36 towards the disc 3, the extensions 35 thereon sliding through the apertures 34 to engage the backing plates 67 and slide the friction pads 21 into contact with the braking surfaces of the disc 3, the pads 21 sliding between the limbs 69 of the saddles 68. Upon release of the master cylinder 23a the pistons 36 will be retracted by the springs 78. The pads 21 may be secured to the piston extensions 35 by a suitable sliding connection or they may be free of the extensions, in which latter case they will be in light rubbing contact with the disc 3 until knocked away from it as by vibration or oscillation of the disc, as known in the art.

The manual mechanism 24 is operated independently of the fluid-pressure brake, either as a separate parking or emergency brake, or simultaneously with the main brake.

Upon operating the hand lever 24a, or the like, to pull the rod or cable 24b, the lever 52 is pivoted on the fulcrum block 54 to pull the pin 63 and so pivot the pressure plate 55 to which the pin 63 is secured towards the disc 3. At the same time, reaction of the lever 52 on the fulcrum block 54 presses the other pressure plate 55 towards the disc 3 and the friction pads 22 are accordingly pressed against the braking surfaces of the disc, the pressure plates 55 pivoting on the pins 61. A helical compression spring (not shown) may be placed on the pin 63 between the pressure plates 55 to act as a positive retraction means for the pads 22 if desired.

As will be evident from the above description the whole of the non-rotatable structure of the brake is constructed from steel pressings which are fabricated into a complete structure by bolting or welding the various components together. Thus it is possible to product a lighter and cheaper brake without any sacrifice of rigidity or braking efficiency. The base plate 1 has greater rigidity and is unlikely to distort or deflect under the fiercest application of the brake. The limbs of the housing are firmly secured both to the base plate 1 at each side of the disc and to each other adjacent the periphery of the disc, making a very strong, rigid structure which is economical both in metal and in fabrication cost. As shown in FIGURE 1, the cylinder blocks 42 are also fabricated structures.

Having now described my invention, what I claim is:

1. A disc brake comprising a rotatable disc, a non-rotatable housing straddling a portion of the periphery and side surfaces of said disc and comprising a supporting plate having a portion extending chordwise and normal to the surfaces of said disc on each side of the disc connected to each other at each end beyond the periphery of said disc, and a pair of rigid plates connected at one end beyond the periphery of said disc and extending radially inwardly on each side of said disc toward the center thereof and joined to and supported at their radially inner ends by said supporting plate to define a rectangular recess open at its axially-inner boundary to a braking surface of said disc, each said plate having an aperture formed centrally therein, a friction element confined in each said recess and movable therein axially into engagement with the sides of said disc, a cylinder mounted on the axially outer side of each said plate in alignment with said aperture and a piston in said cylinder freely slidable in said aperture and extending into engagement with one of said friction elements.

2. The disc brake of claim 1 in which said rigid plates comprise channel plates open toward the surface of the brake disc, said friction elements being slidable in the channels of said plates axially toward the surface of said disc and parallel to the said surface of said disc.

3. A disc brake according to claim 1, comprising automatic adjusting means linking said piston and said cylinder whereby said piston is adapted to move axially in said cylinder in either direction through a restricted free distance only, and to be moved towards said disc through a distance in excess of said restricted free distance upon overcoming the resistance of a friction member disposed between said piston and said cylinder.

4. A disc brake according to claim 1 in which said friction element comprises a rectangular pad of friction material insertable in said rectangular recess in a direction parallel with, and substantially tangential to, said disc and a metal backing plate secured to said friction pad on the axially-outer side thereof, said backing plate being engageable by said extension of said piston, upon movement of said piston axially towards said disc, to force said friction pad into frictional contact with said disc.

5. A disc brake according to claim 4 comprising a stirrup loosely embracing said friction pad on three sides thereof and detachably secured to said housing, said friction pad being freely slidable in said stirrup in either axial direction and being held thereby against dislodgment in one direction tangentially of said disc.

6. A disc brake according to claim 5 comprising a retaining member detachably secured to said housing and engaging said friction pad on the fourth side thereof whereby said friction pad is held against dislodgment in the other direction tangentially of said disc.

7. A disc brake according to claim 1 comprising manually-operated means for applying said brake.

8. A disc brake according to claim 7 wherein said manually-operated means comprises an auxiliary brake operable independently of said piston and cylinder mechanism.

9. A disc brake according to claim 8 wherein said auxiliary brake comprises a pair of fabricated pressure plates pivoted one in each rigid plate of said housing and extending parallel with said supporting plate to one end of said chord adjacent the periphery of said disc, one on each side thereof.

10. A disc brake according to claim 9 comprising a pair of substantially-triangular friction pads associated with said pressure plates, one on each side of said disc, a flanged backing plate secured to each said triangular friction pad on the side thereof adjacent the respective pressure plate and means detachably securing said flanges each to one of said pressure plates.

11. A disc brake according to claim 10 comprising a pin rigidly secured to one said pressure plate and extending axially through a hole in the other said pressure plate, a trunnion adjustably secured to the end of said pin axially-outwardly of said other pressure plate and a lever having one end pivoted to said other pressure plate and its other end connected with a manual operable means and being pivoted on said trunnion medially of said ends.

12. A disc brake according to claim 11 wherein angular movement of said lever relative to said other pressure plate pivots said pressure plates towards said disc to draw said triangular friction pads into frictional engagement therewith.

References Cited in the file of this patent

UNITED STATES PATENTS

| | | |
|---|---|---|
| 2,375,152 | Turner | May 1, 1945 |
| 2,894,607 | Butler | July 14, 1959 |

FOREIGN PATENTS

| | | |
|---|---|---|
| 1,095,832 | France | Dec. 29, 1954 |
| 1,129,042 | France | Sept. 3, 1956 |
| 706,050 | Great Britain | Mar. 24, 1954 |